US012158212B2

(12) United States Patent
Jensen et al.

(10) Patent No.: US 12,158,212 B2
(45) Date of Patent: Dec. 3, 2024

(54) HYDRAULIC VALVE DEVICE AND CENTRIFUGAL PUMP ASSEMBLY INCLUDING SUCH HYDRAULIC VALVE DEVICE

(71) Applicant: GRUNDFOS HOLDING A/S, Bjerringbro (DK)

(72) Inventors: Olav Jensen, Bjerringbro (DK); Bent Døssing, Bjerringbro (DK); Thomas Blad, Bjerringbro (DK); Peter Mønster, Bjerringbro (DK); Ole Hansen, Bjerringbro (DK)

(73) Assignee: GRUNDFOS HOLDING A/S, Bjerringbro (DE)

( * ) Notice: Subject to any disclaimer, the term of this patent is extended or adjusted under 35 U.S.C. 154(b) by 0 days.

(21) Appl. No.: 17/921,657

(22) PCT Filed: Apr. 26, 2021

(86) PCT No.: PCT/EP2021/060819
§ 371 (c)(1),
(2) Date: Oct. 27, 2022

(87) PCT Pub. No.: WO2021/219539
PCT Pub. Date: Nov. 4, 2021

(65) Prior Publication Data
US 2023/0194005 A1    Jun. 22, 2023

(30) Foreign Application Priority Data
Apr. 28, 2020  (EP) .................................. 20171758

(51) Int. Cl.
*F16K 11/074* (2006.01)
*F04D 15/00* (2006.01)
(Continued)

(52) U.S. Cl.
CPC ........ *F16K 11/074* (2013.01); *F04D 15/0005* (2013.01); *F04D 15/0016* (2013.01);
(Continued)

(58) Field of Classification Search
CPC ............... F04D 15/005; F04D 15/0011; F04D 15/0016; F04D 15/0022; F24D 3/105;
(Continued)

(56) References Cited

U.S. PATENT DOCUMENTS

| 2014/0007824 | A1* | 1/2014 | Hayashi | F01P 7/167 |
| | | | | 123/41.01 |
| 2018/0291908 | A1 | 10/2018 | Blad et al. | |
| 2020/0056614 | A1* | 2/2020 | Blad | F04D 1/006 |

FOREIGN PATENT DOCUMENTS

| DE | 4418153 A1 | 11/1995 |
| EP | 3376049 A1 | 9/2018 |
| EP | 3540234 A1 | 9/2019 |

* cited by examiner

*Primary Examiner* — Justin D Seabe
*Assistant Examiner* — Michael K. Reitz
(74) *Attorney, Agent, or Firm* — McGlew and Tuttle, P.C.

(57) ABSTRACT

A hydraulic valve device includes a first inlet port (20) and a second inlet port (22) and a valve element (24) for selectively closing one of the first and the second inlet port. The valve element (24; 24') is rotatable between two valve positions such that a surface of the valve element is moved in a direction parallel to openings of the inlet ports. The valve element includes two separate sealing portions (72, 74), a first sealing portion (72) for closing the first inlet port and a second sealing portion (74) for closing the second inlet port. The two sealing portions are arranged such that in a first valve position a first sealing portion closes the first inlet port and in a second valve position a second sealing portion closes the second inlet port. A centrifugal pump device includes such hydraulic valve device.

17 Claims, 15 Drawing Sheets

(51) Int. Cl.
*F16K 3/08* (2006.01)
*F24D 3/10* (2006.01)

(52) U.S. Cl.
CPC ................ *F16K 3/08* (2013.01); *F24D 3/105* (2013.01); *Y10T 137/86823* (2015.04)

(58) Field of Classification Search
CPC ...... F24D 3/10; F16K 11/074; F16K 11/0716; F16K 11/0525
See application file for complete search history.

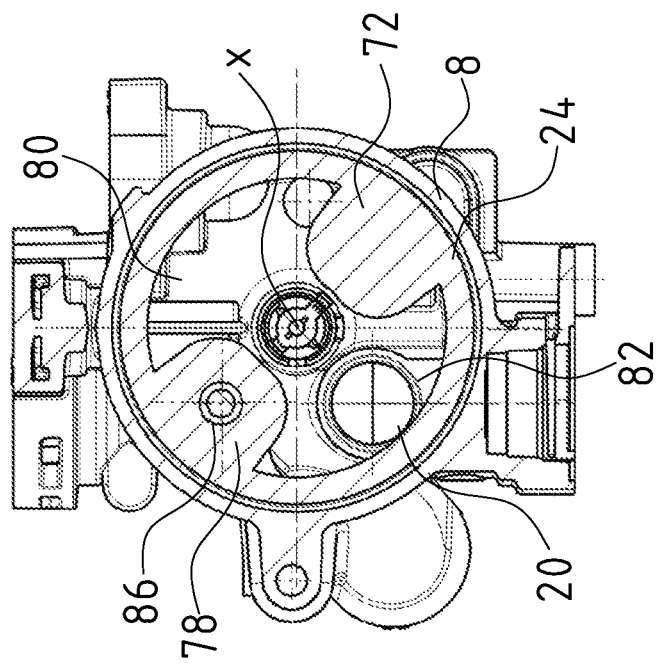
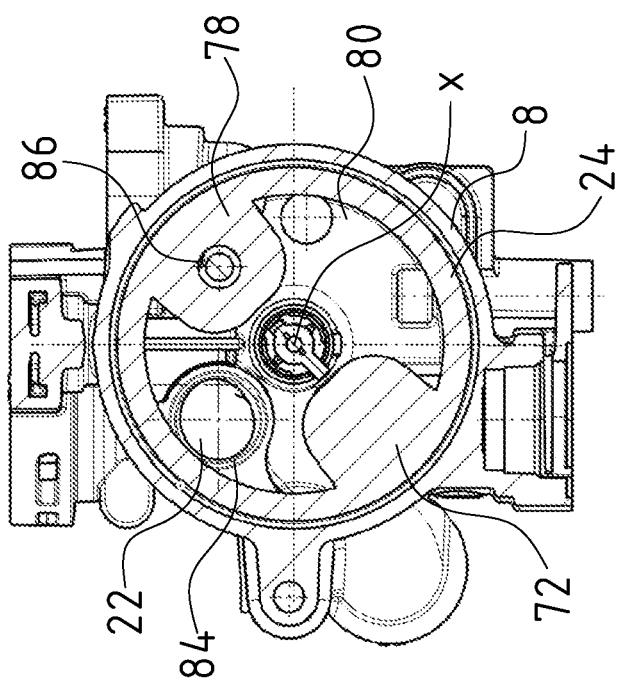

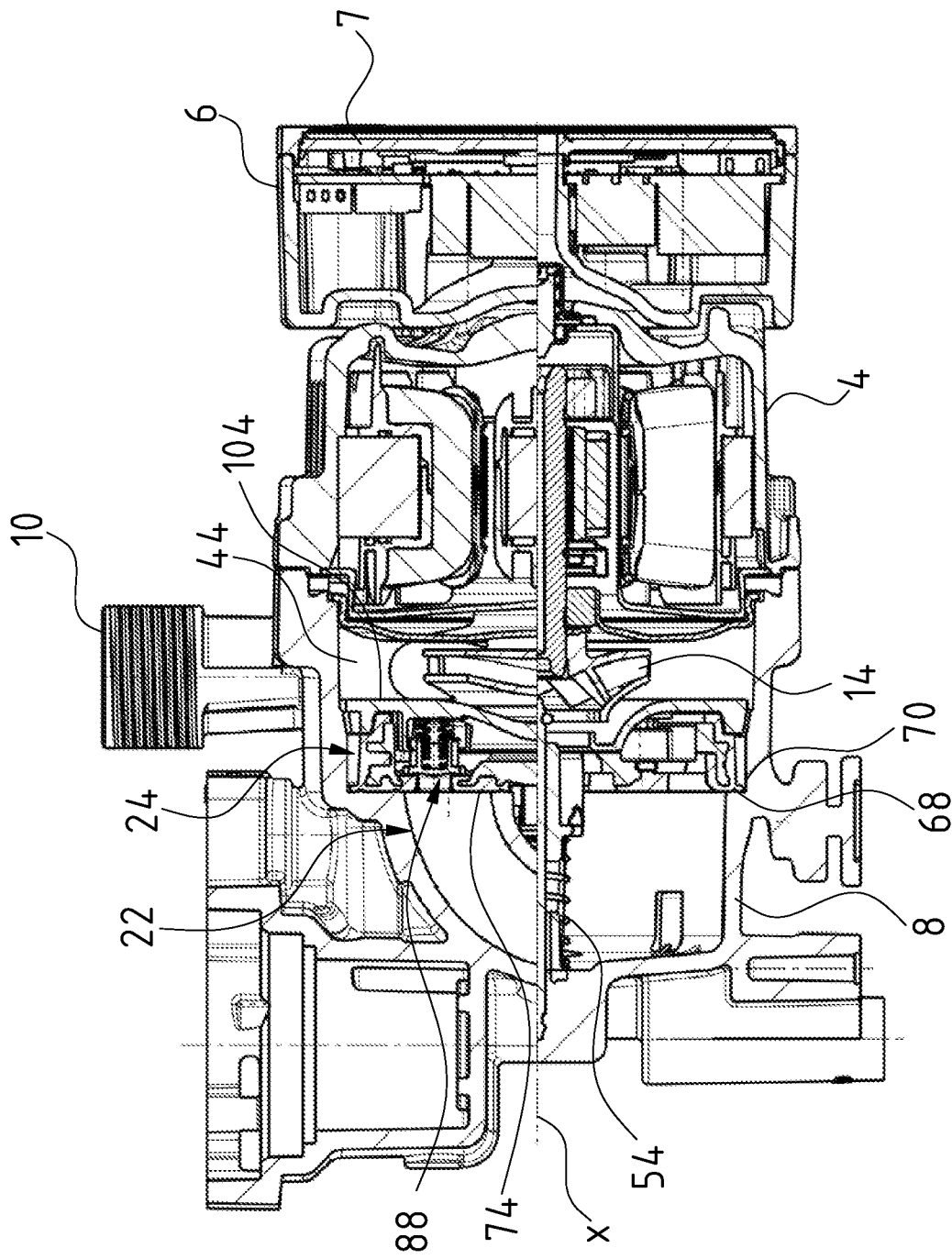

Fig. 15
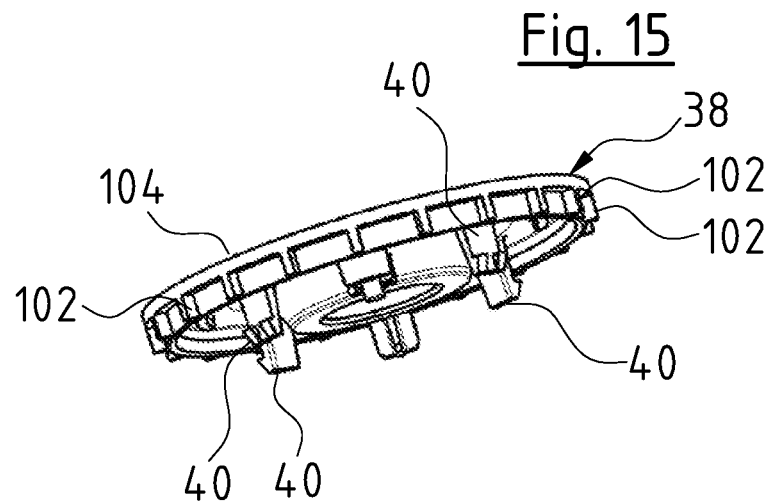
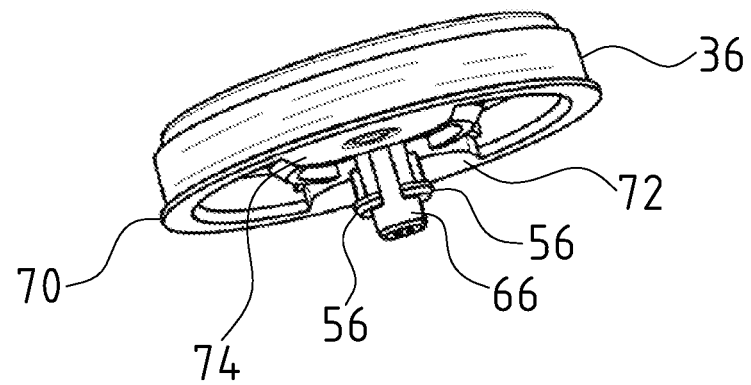
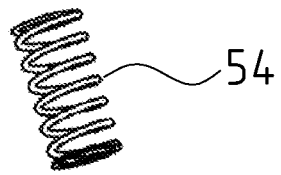
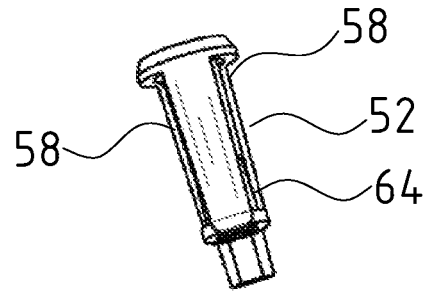

HYDRAULIC VALVE DEVICE AND CENTRIFUGAL PUMP ASSEMBLY INCLUDING SUCH HYDRAULIC VALVE DEVICE

CROSS REFERENCE TO RELATED APPLICATIONS

This application is a United States National Phase Application of International Application PCT/EP2021/060819, filed Apr. 26, 2021, and claims the benefit of priority under 35 U.S.C. § 119 of European Application 20171758.4, filed Apr. 28, 2020, the entire contents of which are incorporated herein by reference.

TECHNICAL FIELD

In particular, in smaller buildings compact heating systems are used for heating the building and providing domestic hot water. Those systems commonly comprise a hydraulic valve device for switching the flow of heating medium between a heating circuit in the building and a heat exchanger for heating the domestic water.

BACKGROUND

EP 3 376 049 discloses an integration of such a valve device into the heating pump device such that the valve element of the valve device is shifted between two possible valve positions by use of the water flow produced by the pump.

SUMMARY

On basis of this prior art, it is an object of the invention to further improve a hydraulic valve device such that it becomes possible to introduce further functionality into such integrated device to create a more sophisticated and compact heating device.

This object is achieved by a hydraulic valve device having the features according to an aspect of the invention and by a centrifugal pump assembly having the features according to another aspect of the invention. Preferred embodiments are disclosed in the following description as well as the accompanying drawings.

The hydraulic valve device according to the invention for example may be used in a heating system for switching the flow of heating medium between at least one heating circuit inside a building and a heat exchanger for heating domestic hot water. The hydraulic valve device comprises a first inlet port and a second inlet port and a valve element. The valve element is arranged and provided for selectively closing one of the first and the second inlet ports. Thus, it is possible to switch the fluid flow between a flow through the first inlet port and a flow through the second inlet port. According to a first embodiment always one of the two inlet ports is closed, i.e. in a first valve position the first inlet port is closed and in a second valve position the second inlet port is closed. However, in an alternative embodiment it may be possible to provide a valve element which is positionable such that in one possible valve position both inlet ports are opened. By moving the valve element, the opening ratio between the two inlet ports may be varied to achieve a variable mixing ratio between the fluid flows through the two inlet ports.

According to the invention the valve element is a rotatable valve element, i.e. the valve element is moved between at least two possible valve positions by rotation. Thereby the valve element and the two inlet ports are arranged such that a surface of the valve element is moved in a direction parallel to the openings of the inlet ports. For example, the openings of the two inlet ports may extend in a plane extending transverse, further preferred normal to the rotational axis of the valve element. Such a configuration of the valve element is advantageous for use in a hydraulic valve device in which the valve element is driven by a fluid flow produced by a pump as described in more detail below. According to the invention, therefore, the valve element is not moved between two possible valve positions in a direction perpendicular to the openings of the inlet ports, but parallel to the plane in which the openings of the inlet ports extend.

According to the invention the valve element comprises two separate sealing portions used for closing the two inlet ports, namely a first sealing portion which is used for closing the first inlet port and a second sealing portion which is used for closing the second inlet port. These two sealing portions are arranged such that in a first possible valve position a first sealing portion closes the first inlet port and the second sealing portion is positioned aside of the second inlet port so that the second inlet port is open. In the second possible valve position, however, the second sealing portion is facing and closing the second inlet port, whereas the first sealing portion is moved away from the first inlet port so that the first inlet port is open. This means that according to the invention the two inlet ports are not selectively closed by the same sealing portion, but by use of two different sealing portions, one separate sealing portion for each inlet port. This allows a more flexible configuration of the hydraulic valve device, since the two sealing portions and inlet ports may be configured in different manner for further purposes or requirements. This allows to introduce a further functionality into the valve device. For example, the two inlet ports and the two sealing portions may offer different cross-sections and hydraulic properties for the fluid flows through the two inlet ports. This allows to optimize the flow paths for each flow, namely through the first inlet port and the second inlet port, independently from another.

According to a preferred embodiment of the invention the first sealing portion is completely and permanently closed and the second sealing portion comprises a valve, in particular a bypass valve. The bypass valve may be configured to open the second inlet port depending on a differential pressure acting on said valve element when the second sealing portion closes the second inlet port. This means, preferably, the bypass valve opens if a predefined differential pressure across this bypass valve, i.e. between the closed second inlet port and the outlet side of the hydraulic valve exceeds a predefined threshold. Such a bypass valve may, for example, be used in a heating system to open a flow path through a heat exchanger for warming domestic water in case that the heating circuit connected to the first inlet port is closed, if for example all radiators in the heating circuit are closed. Then, the bypass valve allows to maintain a certain flow inside the heating device to avoid for example an overheating of a boiler. The integration of the bypass valve into the second sealing portion allows a very compact and fully integrated hydraulic valve device including the complete valve functionality for changing the flow between a heating circuit and a heat exchanger in a heating system. For this configuration it is important that there are two separate sealing portions, since the first sealing portion can be configured independent from the bypass valve, i.e. without such a valve as a completely or permanently closed sealing portion. In this configuration in a first valve position, when the first inlet port is closed, the bypass valve has no functionality so that the closing of the first inlet port is independent from the differential pressure across the valve.

The bypass valve may for example be a spring-loaded check-valve. The spring defines the opening pressure. However, the opening differential pressure may also dependent on the size and the configuration of the valve element of the check-valve. Alternatively, the valve element of the bypass valve may be preloaded in a different way, for example by a magnetic force.

According to a further possible embodiment the openings of the first and the second inlet port facing the valve element are arranged in one plane, preferably a flat plane. Preferably, the plane extends perpendicular to the rotational axis of the valve element. However, it may also be possible that the plane in which the openings of the first and second inlet port are arranged is inclined towards the rotational axis of the valve element. For example, the plane may be frustoconical or conical plane. However, according to a preferred solution the plane is not extending parallel to the rotational axis. This allows to achieve a better sealing by an additional movement of the valve element in a direction parallel to the rotational axis as described below.

According to a preferred embodiment the valve element additionally is movable in axial direction preferably along the rotational axis to bring the sealing portions in sealing contact with opposing valve seats of the inlet ports. The valve seats are preferably surrounding the openings of the inlet ports so that the openings can be closed by a sealing contact between a sealing portion and an opposing or facing valve seat, respectively. This configuration has the advantage that the movement of the valve element between the two possible valve positions can be carried out independent from the actual sealing of the respective inlet ports. This means for changing the valve position in a first step the valve element is moved in axial direction to lift-off the sealing portion from an opposing valve seat. In a second step the valve element can be moved into the other valve position by rotation about the rotational axis and, then, in a third step the valve element is moved backwards in axial direction to press the other sealing portion against the respective opposing valve seat. Thus, the sealing portions and valve seats are out of engagement when the valve element is moved between the valve positions so that the friction can be reduced. This, in particular is advantageous if the valve element is moved by the fluid flow and/or hydraulic forces.

According to a further possible embodiment the valve element comprises a support member, a cover member and a movable bypass valve element being arranged between the support member and the cover member. This allows an easy integration of the bypass valve into the valve element. The valve element is assembled by the two parts, the support member and the cover member. The bypass valve element can easily be integrated when assembling the valve element. According to a preferred embodiment the support member and the cover member are connected by a snap fit. This allows an easy assembling, furthermore, depending on the configuration of the snap fit it may be possible to disassemble the valve element, for example to exchange the bypass valve element. Beside the bypass valve element, a spring for preloading the bypass valve element may be integrated and fixed between the support member and the cover member. Furthermore, preferably the necessary guiding elements for guiding the bypass valve element can be integrated into the support member and/or the cover member, in particular made integral with at least one of these parts. Preferably the guiding means is configured such that it guides the movable bypass valve element along a predefined, preferably linear movement path. According to a further preferred embodiment this linear movement path or axis extends parallel to the rotational axis of the valve element.

The first and second sealing portions preferably are arranged on the support member. The sealing portions may comprise elastic portions improving the sealing properties when in contact with an opposed valve seat. Preferably the support member is rotatable on a fixed axis or connected to a bearing element guided or supported on a fixed axis.

The bypass valve element may be exchangeable, for example by opening the connection between a cover member and a support member as mentioned before. According to a preferred embodiment there are provided at least two exchangeable bypass valve elements of different size, wherein the size of the bypass valve element defines the opening pressure of the bypass valve. The opening pressure can for example be defined by the ratio of the surface areas on two sides of the bypass valve element facing away from each other. By exchanging the bypass valve elements the opening pressure of the bypass valve can be changed. Preferably the different sized bypass valve elements all can be used with the same spring element so that only the bypass valve element and not the spring element for preloading the bypass valve element has to be changed to define the opening pressure threshold.

According to a further possible embodiment the second sealing portion comprises the sealing member provided for contacting a valve seat of the second inlet port and is provided for a sealing contact with a bypass valve element of the bypass valve. The sealing member for example is made of an elastic material. The sealing member may be formed as a separate element connected to the valve element, in particular the support member of the valve element. It may also be possible to connect the sealing member and preferably all other sealing members by an injection molding process to the valve element, in particular the valve element support member. If the sealing member is used for sealing both the second inlet port and the bypass valve the number of necessary components can be reduced and the assembling can be simplified.

According to a further possible embodiment of the invention the valve element comprises at least one inlet opening facing the first inlet port in one possible valve position, for example a second valve position. In this valve position the second sealing portion of the valve element is closing or sealing the second inlet port. The inlet opening of the valve element creates a flow path from the first inlet port through the valve element. In another possible valve position, for example a first valve position, the inlet opening is facing the second inlet port so that a flow path from the second inlet port through the valve element is created. In this position the first sealing portion closes the first inlet port. According to a preferred embodiment the at least one inlet opening is in fluid connection with an outlet opening of the valve element. There may be a channel or free space in the interior of the valve element connecting the inlet opening and the outlet opening. Preferably the inlet opening and the outlet opening are opened to facing away surfaces of the valve element, i.e. in opposite direction, preferably in opposite direction parallel to the rotational axis of the valve element. For example, the outlet opening may be opened towards a front side of the valve element, whereas the inlet opening is opened towards an opposing backside of the valve element.

If the valve element is used in combination with a pump as described below in more detail the outlet opening of the valve element may be opened towards an inlet port of an impeller of the pump.

According to a further preferred embodiment the valve element comprises at least one mechanical end stop defining at least one of the two valve positions. Further preferably the valve element comprises two opposing mechanical end stops defining the two different valve positions. The end stop or the end stops may be configured as a stop facing and butting against a stop element formed on a surrounding valve housing. Preferably, the end stop or the end stops are arranged radially inside the sealing portions, for example in a central region of the valve element surrounding the rotational axis of the valve element. Thus, the end stops are arranged in the center region of the rotational valve element resulting in a damping effect if the valve element reaches the end position defined by the end stop. The end stop comes into contact with an opposing stop element arranged in the valve housing. By elasticity of at least parts of the valve element the impact on the end stop can be damped.

Preferably, the valve element comprises at least one mechanical end stop defining at least one of the two valve positions, which end stop comprises a stop element connected to the valve element via an elastic element and preferably via a spring. This spring may be a spring forcing the valve element in axial direction along the rotational axis. Thus, the spring can have a double function, forcing the valve element into one of two possible positions along the rotational axis and ensuring a damping effect if the valve element comes in abutment with an end stop defining one of the valve positions in rotational direction. The spring may be a helical spring creating an axial force by compression and a damping effect by torsion. According to a further possible embodiment the spring is located between the valve element or the support member of the valve element as described above and a bearing element supported on a fixed axis or pivot for rotation of the valve element around this fixed axis. The bearing member may be movable in longitudinal direction relative to the support element by compression of the spring arranged between the bearing member and the valve element or the support element, respectively. The bearing element may be guided in longitudinal direction on the support member wherein the guiding has a certain play allowing a limited movement in rotational direction under torsion of the spring arranged between the support member and the bearing member.

Beside the hydraulic valve device as described above a centrifugal pump assembly is subject of the present invention. The centrifugal pump assembly according to the invention comprises an electric drive motor and at least one impeller driven by this drive motor. The centrifugal pump assembly preferably is a circulator pump as used in heating systems. The electric drive motor in particular may be a wet-running motor with a rotor can between the dry stator region and the rotor space containing the rotor and being filled by the liquid to be pumped. The rotor may be connected to the impeller via a rotor shaft. Furthermore, the centrifugal pump assembly according to the invention comprises a hydraulic valve device as described before. The hydraulic valve device acts as a valve for switching the flow path between two suction ports of the pump device so that the impeller can suck fluid either from a first suction port or a second suction port depending on the valve position of the hydraulic valve device. The first inlet port of said hydraulic valve device thereby forms a first suction port and the second inlet port of the hydraulic valve device forms a second suction port. Thus, by rotation of the valve element the flow path can be switched between these two suction ports. Such a centrifugal pump assembly can for example be used in a compact heating system for circulating the heating fluid. The hydraulic valve can be used to switch the fluid flow between a heating circuit inside a building and a heat exchanger for warming domestic hot water. Thereby, the valve element preferably is arranged on the suction side of the impeller such that the outlet of the valve element is in fluid connection with the inlet or suction mouth of the impeller.

According to a preferred embodiment, selectively the first or the second suction port is in fluid conducting connection with the suction mouth of the at least one impeller, depending on the switching or valve position of the valve element. In a first valve position preferably the second suction port is in fluid connection with the impeller, whereas in a second valve position the first suction port is in fluid connection with the impeller. The respective other suction port is closed by the corresponding sealing portion of the valve element.

According to a further preferred embodiment a cover element of the valve element, in particular a cover element as described above, comprises an outlet opening being in engagement with the suction port of the impeller. The outlet opening of the valve element is preferably arranged in the center of the valve element concentrically to the rotational axis of the valve element and the rotational axis of the impeller. Furthermore, the outlet opening preferably has a circular shape engaging with the suction port of the impeller. The suction port of the impeller can rotate in engagement with the outlet opening of the cover element. By this a fluid flow through the valve element out of the outlet opening and directly into the suction port of the impeller can be achieved during rotation of the impeller.

According to a further possible embodiment the centrifugal pump assembly including the hydraulic valve device is configured such that for movement between the first and the second valve position said valve element is driven by a fluid flow produced by the impeller. For this the valve element may be arranged concentrically to the impeller such that the cover plate of the valve element extends substantially parallel to the impeller surface. Such valve element may be driven by a rotating fluid flow produced by the impeller as for example known from EP 3 376 049 A1.

Furthermore, preferably the valve element is arranged between the suction side and the pressure side of the pump assembly such that a pressure produced by the impeller is acting on one side of the valve element and the first sealing portion of the valve element is forced against a valve seat of the first inlet port or the second sealing portion is forced against a valve seat of the second inlet port, depending on the respective valve position. In this arrangement preferably the cover plate of the impeller is faced towards the impeller and the sealing portions are arranged on the opposite side facing away from the impeller. Because of the axial movability of the valve element the valve element may be shifted by the pressure produced by the impeller such that it is forced against the valve seat to ensure a secure sealing. If the impeller speed is reduced or the pump is switched off the outlet pressure of the impeller is reduced and the valve element may be moved backwards in axial direction for example by a spring element so that the sealing portions lift-off from the valve seats and the valve element can easily be rotated in a different valve position.

In the following the invention is described by way of an example with reference to the accompanying drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 6 is a sectional view of the valve device in the centrifugal pump device according to FIGS. 1 to 5, with the valve element in a first valve position;

FIG. 7 is a sectional view of the valve device according to FIG. 6 with the valve element in a second valve position;

FIG. 8 is a sectional view of the centrifugal pump device along line VIII-VIII in FIG. 2, with the valve element in its second valve position;

FIG. 15 is an exploded view of the valve element according to FIG. 9 seen from a different direction;

DESCRIPTION OF PREFERRED EMBODIMENTS

Figure 1:
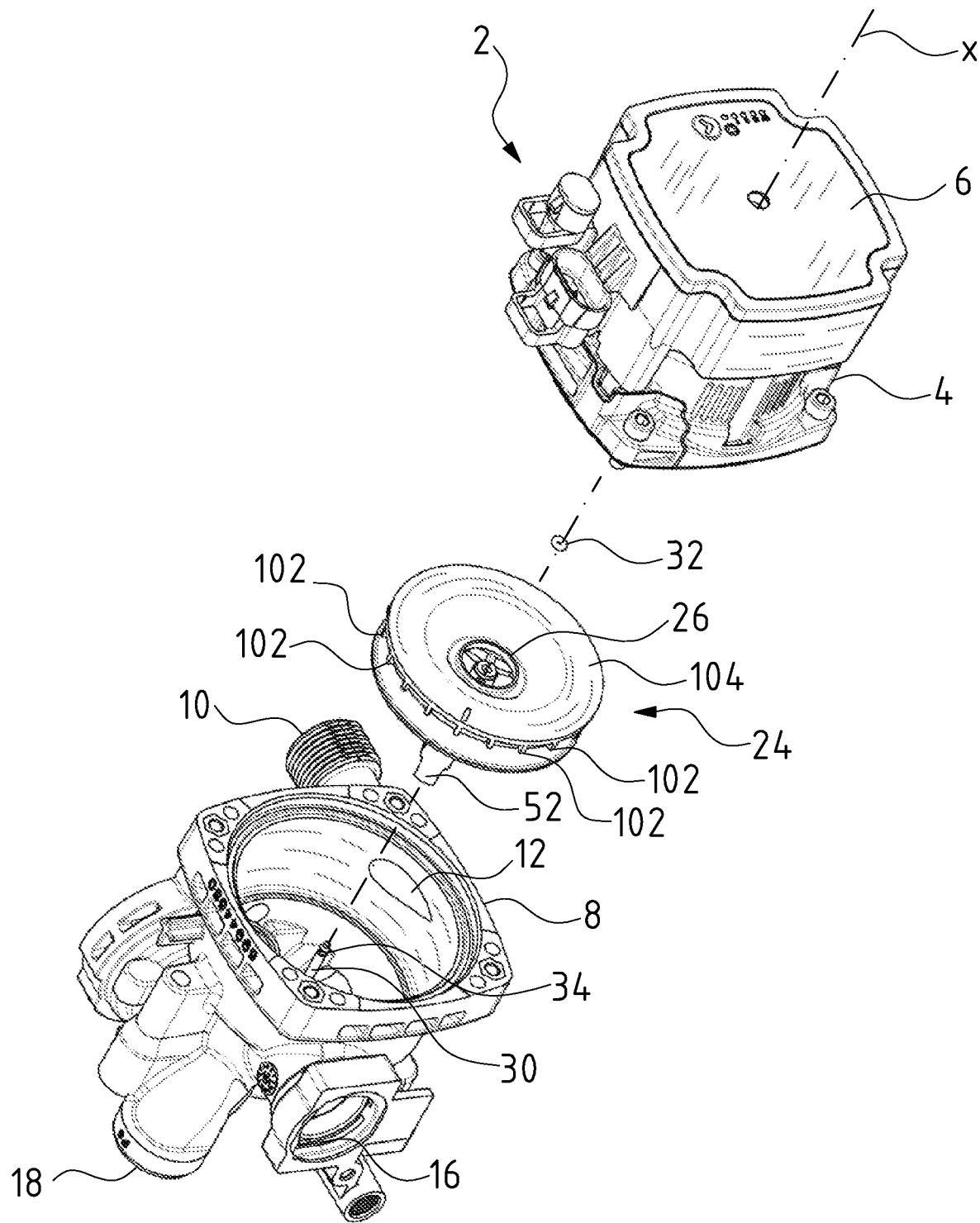
FIG. 1 is an exploded view of a centrifugal pump device according to the invention.
Figure 2:
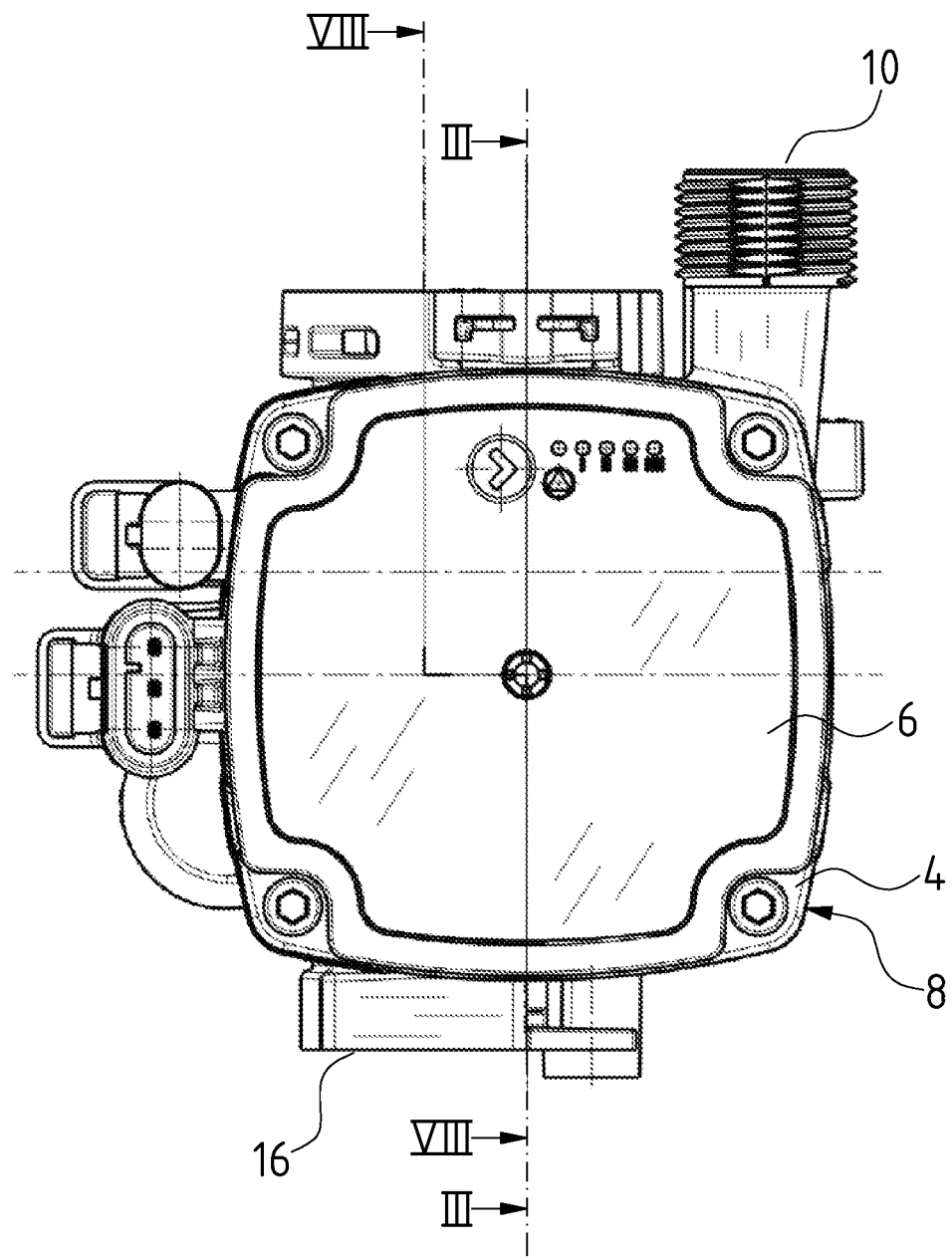
FIG. 2 is a top view on the centrifugal pump device according to FIG. 1, on the axial end side of the electronic housing.

Referring to the drawings, the centrifugal pump described as an example is a centrifugal pump provided for a heating system. This centrifugal pump device includes a hydraulic valve device which can be used in the heating system to change the fluid flow between a heating circuit through a building and a heat exchanger for heating domestic water.

The centrifugal pump device has an electric drive motor 2 comprising a motor housing 4 inside which the stator and the rotor are arranged. On one axial end of the motor housing, in direction of the longitudinal axis X, there is arranged an electronics housing 6 comprising the control electronics 7 for the electric drive motor. On the opposite axial end the motor housing 4 is connected to a pump housing 8 comprising an outlet connection 10 connected to an outlet port 12 in the inside of the pump housing 8. The outlet port 12 is arranged on the outer circumference of a pump space inside which the impeller 14 is arranged. The pump housing 8, further, comprises two inlet connections 16 and 18. The first inlet connection is provided for a connection to a heating circuit in a building, whereas the second inlet connection 18 is provided for connection to a heat exchanger for warming domestic hot water. The first inlet connection 16 is in fluid connection with the first inlet port 20 inside the pump housing 8. The second inlet connection 16 is in connection with a second inlet port 22 inside the pump housing 8. The inlet ports 20 and 22 are arranged in one flat plane perpendicular to the longitudinal or rotational axis X. The rotational axis X is the rotational axis of the impeller 14 and the valve element 24 described in more detail later. The first and the second inlet ports are arranged in the bottom of the pump housing 8 seen in the longitudinal direction X.

The valve element 24 is arranged to switch over the flow path towards the impeller 14 between the two inlet connections 16 and 18. Basically, the function of this hydraulic valve device is similar as disclosed in EP 3 376 049. The valve element 24 has a central outlet opening 26 facing the suction mouth 28 of the impeller 14 or being in engagement with the suction mouth 28 such that fluid flows from the outlet opening 26 into the suction mouth 28.

The valve element 24 is rotatable about the rotational axis X which corresponds to the rotational axis X of the impeller 14. The valve element 24 is arranged on a pivot or bearing post 30 fixed in the bottom of the pump housing 8. In this embodiment the pivot is molded into the material of the pump housing 8, for example in an injection molding process. However, the bearing post may be fixed in the bottom of the pump housing 8 in different manner, for example being screwed into a threaded hole or being formed integrally with the pump housing 8. The bearing post 30 extends from the bottom of the pump housing 8 in the longitudinal direction X into the interior of the pump housing 8. The valve element 24 is rotatable about the longitudinal axis X and movable in a linear direction on the bearing post 30 along the longitudinal axis X in a certain distance. This certain distance is limited by an O-ring 32 forming an axial stop or abutment for the valve element 24. The O-ring 32 engages into a circumferential groove or notch 34 arranged close to the free distal end of the bearing post 30. The O-ring 32 forms an elastic axial stop and allows an easy assembling without special tools.

In this embodiment the valve element 24 is composed of two parts, a support member 36 and a cover member 38 which are connected by a snap fit. On the inner surface of the cover member 38 there are arranged engagement hooks 40 which embrace or engage with engagement shoulders or projections 42 in the interior of the support member 36. The cover member 38 has a cover plate 104, i.e. a cover of plate like shape, and is completely closed except the central outlet opening 36. When arranged inside the pump housing 8 the cover plate 104 of the cover member 38 forms one axial wall of the pump space 44 inside which the impeller 14 is rotating. The opposite axial wall of the pump space 44 is formed by a bearing plate 46 holding one bearing for the rotor shaft 50. Opposite to the cover member 38 there is connected a spring support 52 to the support member 36. Between the spring support 52 and the support member 36 there is arranged a helical compression spring 54. The spring 54 with one axial end abuts against an interior bottom surface of the spring support 52 and with the opposite axial end abuts against apportion of the support member 36. The spring support 52 overlaps with elastic engagement hooks 56 such that the engagement hooks 56 engage with openings or cut-outs 58 in the outer circumference of the spring support 52 from the inside of the spring support 2. Thereby the spring support 52 is guided on the outside of the legs of the engagement hooks 56 in axial direction X such that the spring support 52 is movable in this axial direction on the outside of the legs of the engagement hooks 56. Furthermore, on the support member 38 there is provided a rib 60 in the spring support 52. Rib 60 and slot 62 allow a relative movement in axial direction, but ensure a torque transfer so that the spring support 52 is connected to the support member 36 substantially torque proof except a limited play in circumferential direction between the rib 60 and the slot 62. This play ensures a damping effect provided by torsion of the compression spring 54 since the spring 54 is in the flux in rotational direction until the rib 60 abuts on one of the edges of the slot 62.

On the axial end opposite to the support member 36 the spring support 52 comprises a bearing portion 64 movably supported on the bearing post 30, i.e. sliding on the outer circumference of the bearing post 30. A further bearing portion 66 in bearing contact with the bearing post 30 is formed in the support member 36. The bearing portion 66 comprises a shoulder protruding in radial direction. Against this shoulder the axial end of the compression spring 54 abuts.

Figure 3:
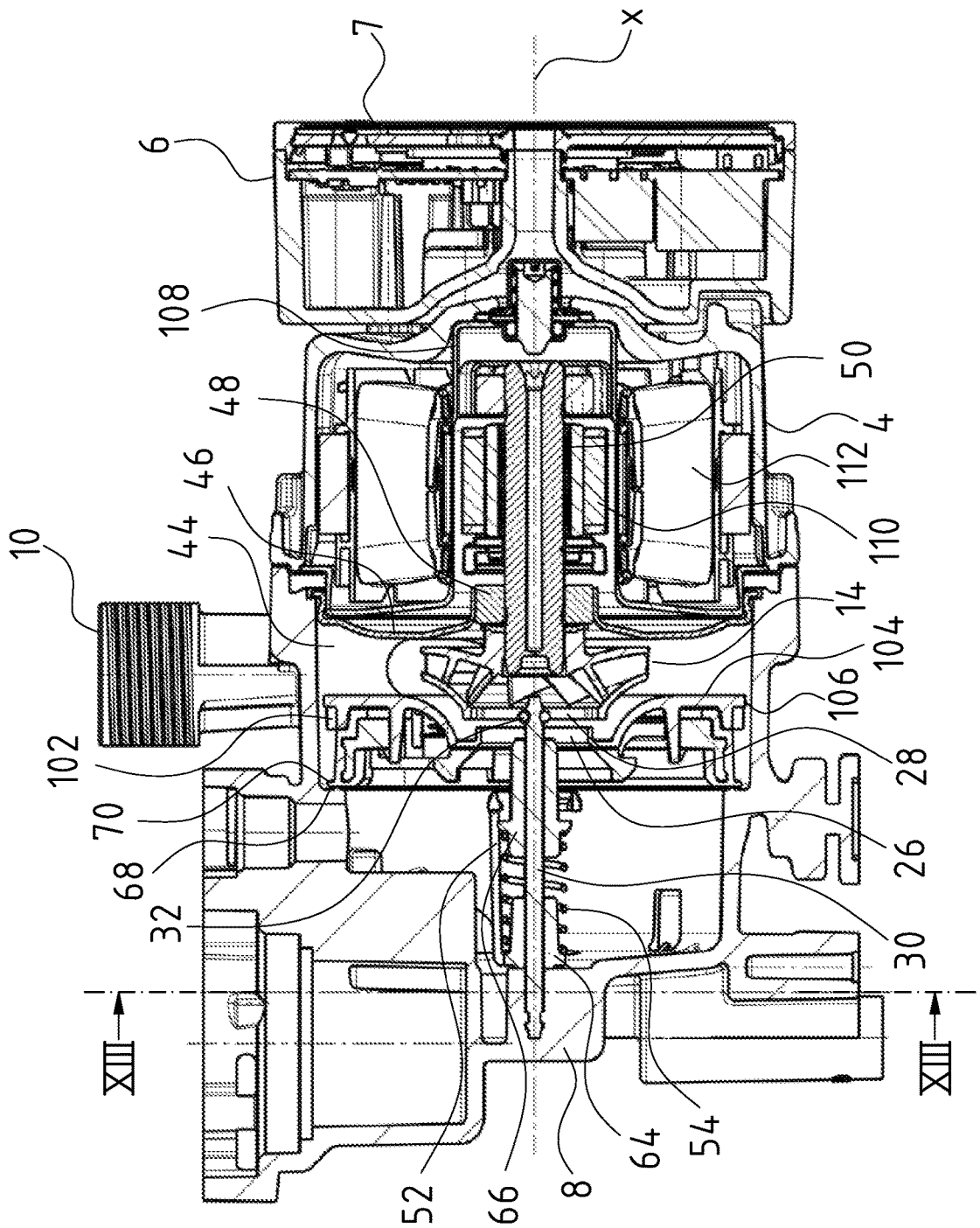
FIG. 3 is a sectional view of the centrifugal pump device according to FIGS. 1 and 2 along line in FIG. 2, with a valve device in its sealed position.
Figure 4:
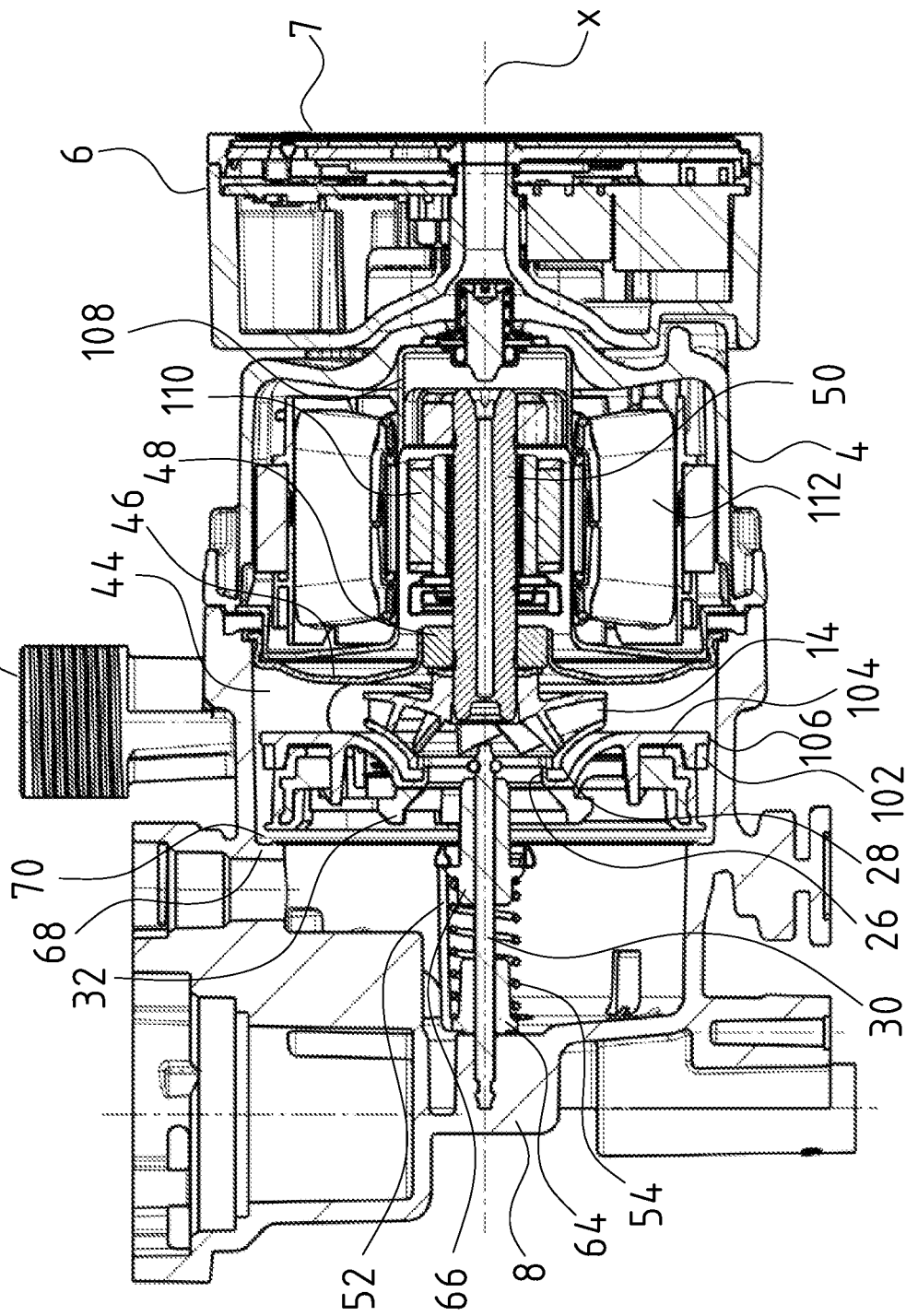
FIG. 4 is a sectional view similar to FIG. 3 with the valve device in its released and rotatable position.
Figure 5:
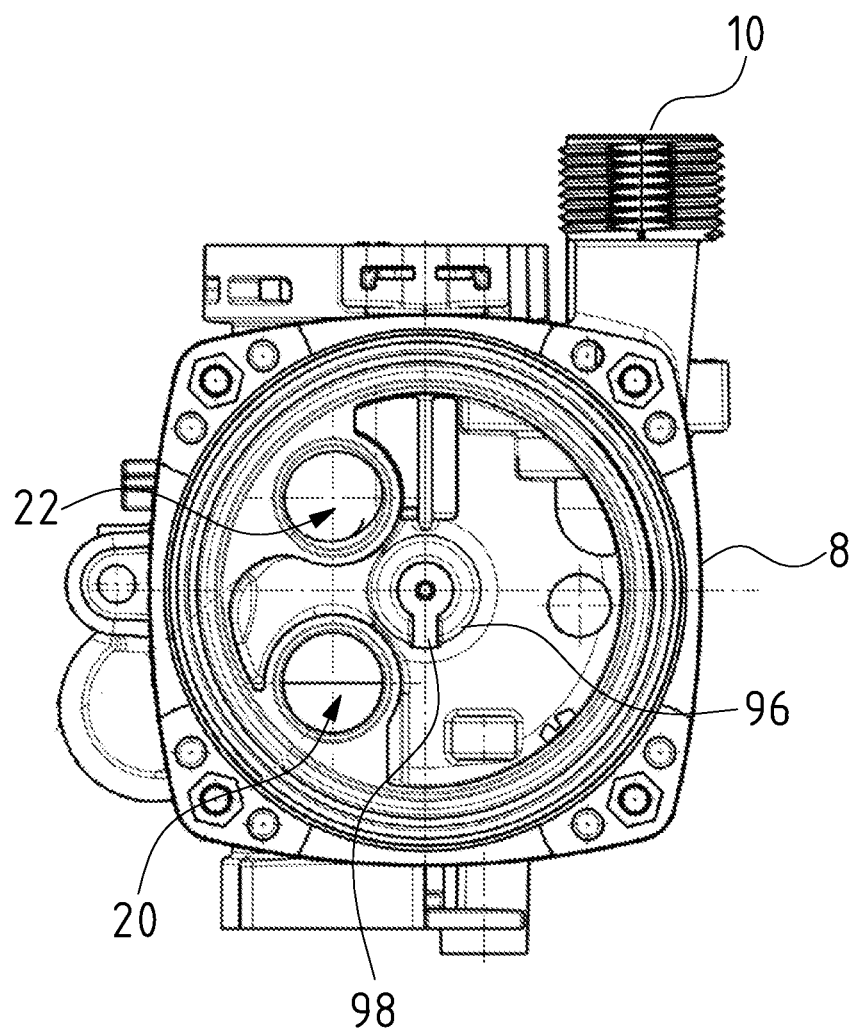
FIG. 5 is a top view on the opened pump housing of the centrifugal pump device according to FIGS. 1 to 4.
Figure 9:
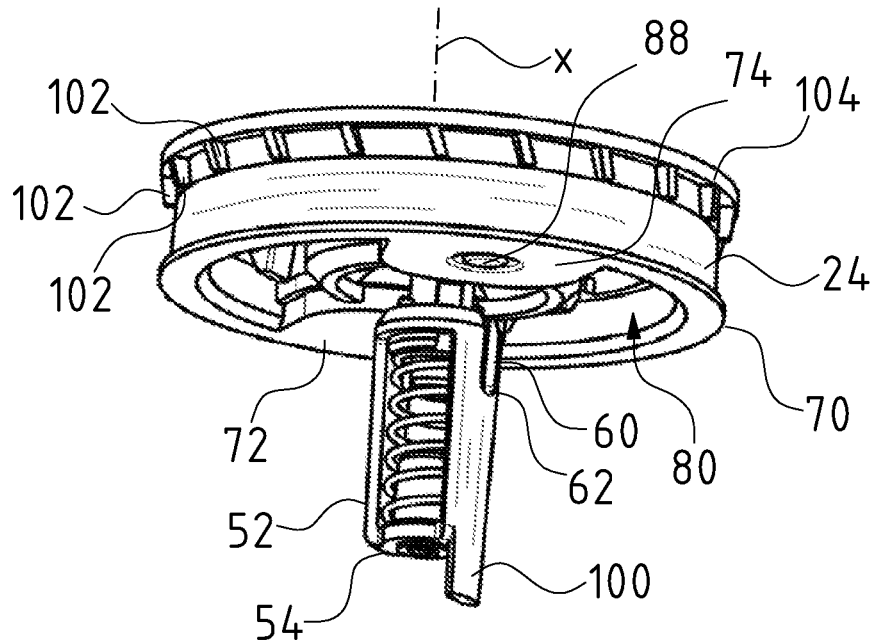
FIG. 9 is a perspective view of the valve element in the centrifugal pump device according to FIGS. 1 to 8.
Figure 10:
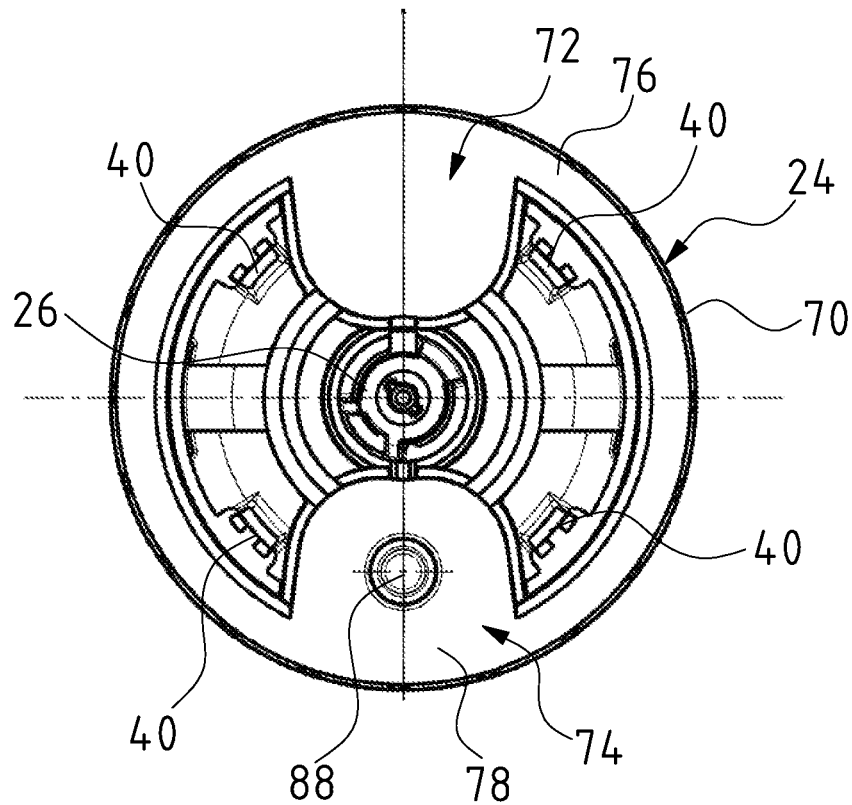
FIG. 10 is a plan view of the bottom side of the valve element containing the sealing portions.
Figure 11:
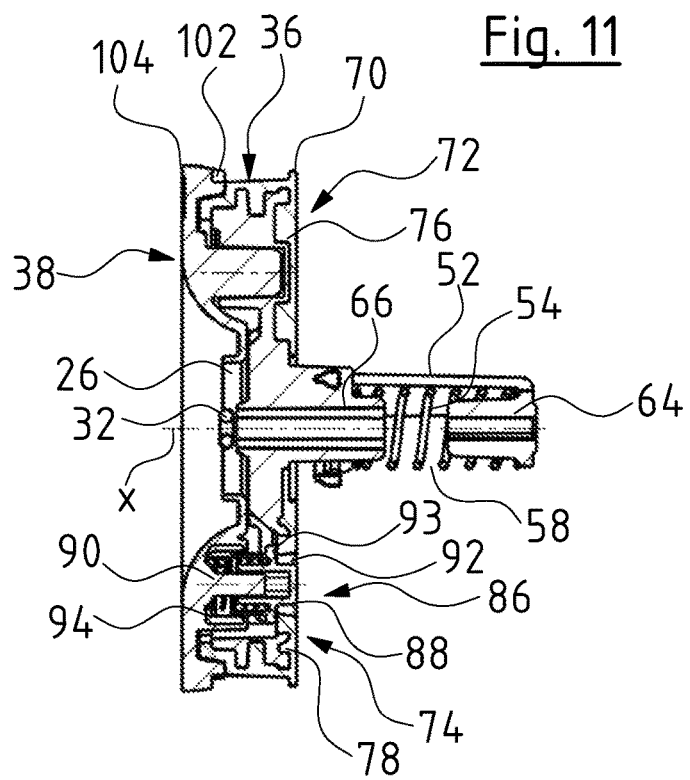
FIG. 11 is a sectional view of the valve element with a bypass valve in its closed position.
Figure 12:
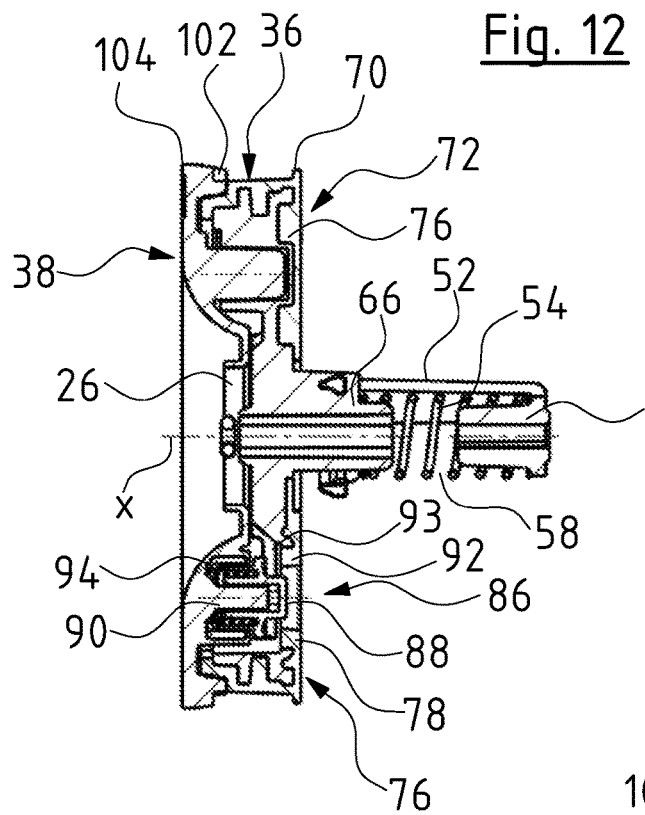
FIG. 12 is a sectional view according to FIG. 11 with the bypass valve in its opened position.

The compression spring 54 forces the bearing portions 64 and 66 away from each other and forces the valve element 24 in an axial direction towards the motor housing 4. Under compression of the spring 54 the valve element 24 may be moved towards the bottom side of the pump housing 8, i.e. away from the impeller 14 and the motor housing 4. These two possible axial positions of the valve element 24 are shown in FIGS. 3 and 4. In FIG. 4 the valve element 24 is in its first axial position in which the valve element 24 abuts against a circular shoulder 68 in the interior of the pump housing 8. The shoulder 68 extends in radial direction from the inner circumference of the pump housing 8 providing a circular sealing surface extending substantially perpendicular to the longitudinal axis X. The valve element 24 is in sealing contact with this shoulder 68 via an elastic sealing 70 on the outer circumference of the support member 36. This sealing 70 ensures a sealing of the pump space 44 towards the suction side of the pump device. FIG. 4 shows a second axial position of the valve element 24 in which the valve element 24 is moved towards the impeller 14 such that the sealing 70 is not in contact with the shoulder 68 anymore, but distanced from the shoulder 68. In this position the valve element 24 is freely rotatable about the longitudinal axis X. If the sealing 70, however, is in contact with the shoulder 68 a rotation of the valve element 24 is prohibited due to the frictional forces between the sealing 70 and the shoulder 68. Thus, the shoulder 68 and the sealing 70 act as a detachable coupling or clutch. The valve element 24 is moved into the released position shown in FIG. 4 by the spring forces of the compression spring 54. Into the fixed position as shown in FIG. 3, in which the sealing 70 is in contact with the shoulder 68, the valve element 24 is moved by the pressure produced by the impeller 14 and acting on the cover member 38 surrounding the outlet opening 26. Thus, the valve element 24 can selectively be moved in axial direction depending on the pressure produced by the pump on the outlet side of the impeller 14. This can be controlled by speed control and regulation carried out by the control electronics 7 arranged in the electronics housing 6.

The valve element 24 comprises two sealing portions 72 and 74, i.e. a first sealing portion 72 and a second sealing portion 74. The two sealing portions 72 and 74 are arranged on the outer axial surface of the support member 36, i.e. on the axial face side of the valve element 24 facing away from the impeller and being opposed to the first and second inlet ports 20 and 22. The two sealing portions 72 and 74 are arranged in a common plane extending perpendicular to the rotational axis X. The two sealing portions 72 and 74 are positioned diametral in relation to the axis X, i.e. in positions offset by 180° about the rotational axis X. The two sealing portions 72 and 74 each comprises an elastic sealing member 76, 78, which in this embodiment are formed integral with the sealing 70 on the outer circumference of the support member. The sealing 70 and the sealing members 76 and 78 may be formed as a separate part or sealing arrangement connected to the support member 36 or connected to the support member 36 by an injection molding process.

The first sealing portion 72 is provided to selectively close the first inlet port 20 and the second sealing portion 24 is provided to selectively close the second inlet port 22. Between the two sealing portions 72 and 74 there is provided an opening 80 in the support member 36 being in fluid connection with the outlet opening 26 and forming an entrance opening of the valve element 24.

The valve element 24 can take two different valve positions in rotational direction about the longitudinal axis X. FIG. 6 shows the first valve position in which the first sealing portion 72 closes the first inlet port 20. In this first valve position the second inlet port 22 is open towards the opening 80 in the valve element 24 such that a fluid flow from the inlet port 22 towards the outlet opening 26 and into the suction mouth 28 of the impeller 24 is enabled. In this first valve position, therefore, the impeller 14 and thus the entire pump sucks fluid through the first inlet connection 60 which is connected to the first inlet port 20. In this first valve position when the valve element 24 is in its engaged or sealing position as shown in FIG. 3 the first sealing portion 72 with its sealing member 76 is pressed against a valve seat 82 formed by the surrounding circumference or edge of the inlet port 20. By this the first inlet port 20 is completely closed.

In the second valve position as shown in FIG. 7 the first sealing portion 72 is rotated aside from the first inlet port 20 such that the first inlet port 20 is opened towards the opening 80 providing a flow path from the first inlet port 20 towards the outlet opening 26 and the suction mouth 28 of the impeller 14. In this second valve position the second sealing portion 24 is moved into a position in which it covers the second inlet port 22 so that the second inlet port 22 is closed. In the engaged or sealed position of the valve element 24 the sealing member 78 of the second sealing portion 24 is pressed against a valve seat 84 formed on the outer circumference or edge of the second inlet opening 22.

Deferring from the first sealing portion 76 the second sealing portion 78 is not completely closed but contains a further valve in form of a check valve forming a bypass valve 86 as best shown in FIGS. 10-13. The bypass valve 86 has an opening 92 in the second sealing portion 74 which opening 92 is facing the second inlet port 22 in the second valve position as shown in FIG. 7. The bypass valve 86 comprises a bypass valve element 88 arranged between the support member 36 and cover member 38 of the valve element 24. The bypass valve element 88 is guided in a linear direction parallel to the rotational axis X on a guiding element 90 engaging into the bypass element 88. The bypass valve element 88 in its closed position abuts against a valve seat formed by the sealing member 78 surrounding the opening 92 or defining the opening 92 inside the second sealing portion 74. The bypass valve element 88 is hold in this closed or sealed position by a compression spring 94 forcing the bypass valve element 88 into the shown sealed or closed position. By a pressure acting on the bypass valve element 88 the bypass valve element 88 can be moved along the guiding element 90 against the force provided by the compression spring 94 to open the opening 92. The backside of the bypass valve element 88 facing away from the opening 92 is in contact with the opening 80 and the outlet opening 26, i.e. in contact with the suction side of the pump and with the flow path towards the suction mouth 28 of the impeller 14. Thus, the pressure on the suction side of the pump is acting onto the backside of the bypass valve element 88. If the pressure difference between both sides of the bypass valve 86 or bypass valve element 88, respectively, exceeds a predefined threshold, which is defined by the size of the bypass valve element 88 and the spring 94, the bypass valve 86 opens to allow a fluid flow from the second inlet port 22 towards the impeller 14 although the second inlet port 22 is closed by the second sealing portion 74. This functionality may be used in a heating system when a heating circuit in a building is connected to the first inlet connection 16. In case that all radiators in the heating circuit are closed there would be no fluid flow through this first inlet connection 16. In this condition the pressure on the suction side of the impeller 14 and, therefore, on the backside of the bypass valve element 88 will reduce to such an extent that the pressure difference across the bypass valve 86 exceeds the predefined threshold and the bypass valve 86 opens ensuring a fluid flow through the second inlet port 22 to which for example a heating exchanger for heating domestic water may be connected. In a heating system, thus, a fluid flow through the boiler can be ensured avoiding an overheating of the boiler.

The threshold for opening the bypass by the bypass valve 86 preferably it adjusted by exchanging the bypass valve element 88. There may be provided exchangeable bypass valve elements 88 of different size, in particular having different sized back surfaces onto which the pressure on the suction side of the pump acts. Since the opposite surface is always defined by the cross section of the opening 92 it is possible to adjust the forces acting in both directions onto the bypass valve element 88 by changing the size of the back surface. Alternatively, or in addition also the size of the surface closing the opening 92 can be adjusted by changing the diameter of the circular protrusion 93 on the bypass valve element 88 being in contact witch the valve seat in the sealing member 78.

Figure 13:
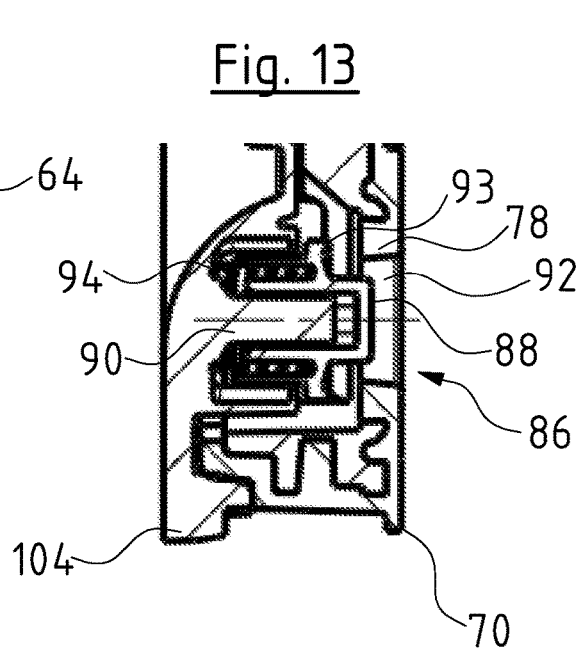
FIG. 13 is an enlarged cross section of the bypass valve 86 as shown in FIG. 12.
Figure 14:
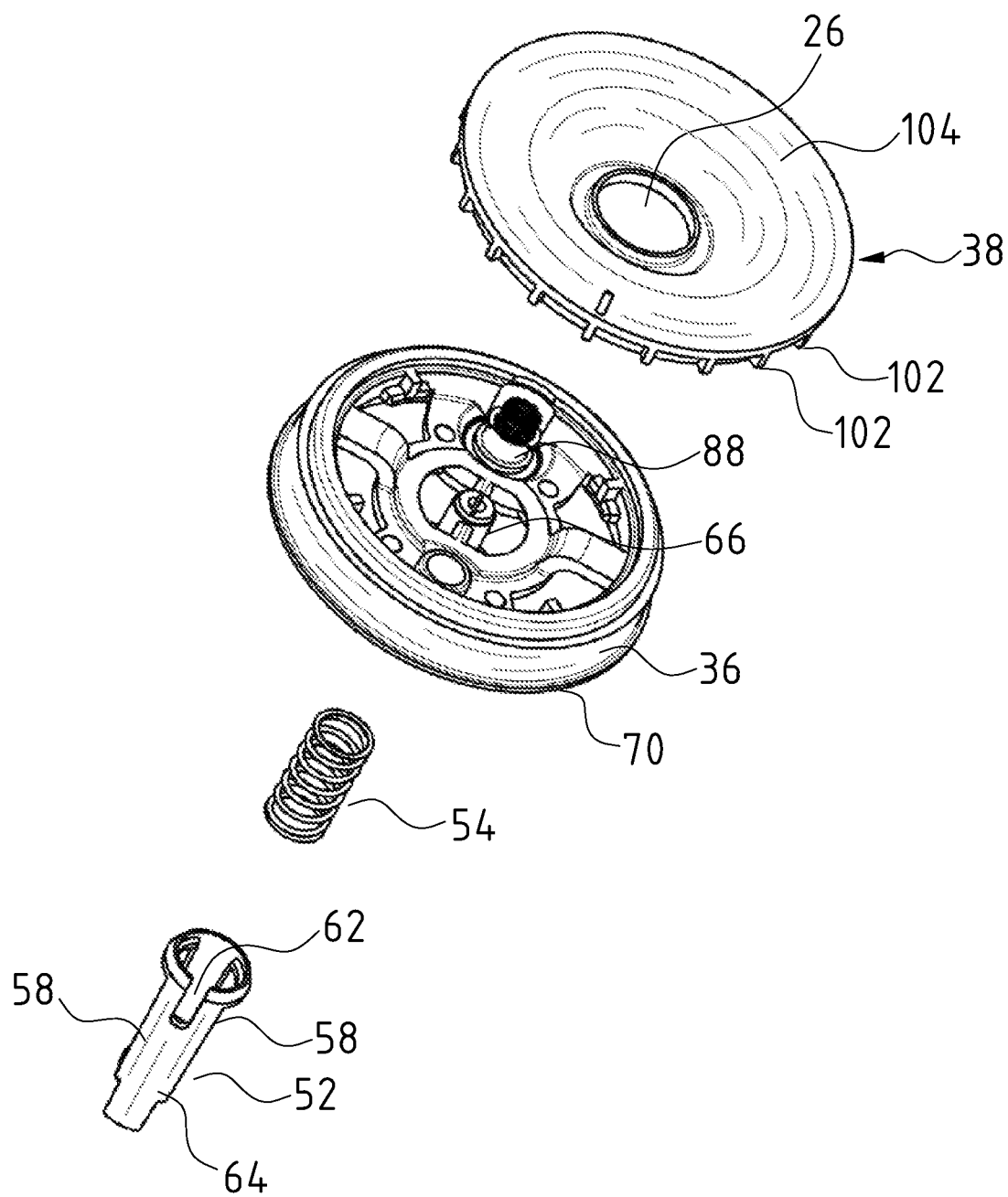
FIG. 14 is an exploded view of the valve element according to FIG. 9.
Figure 17:
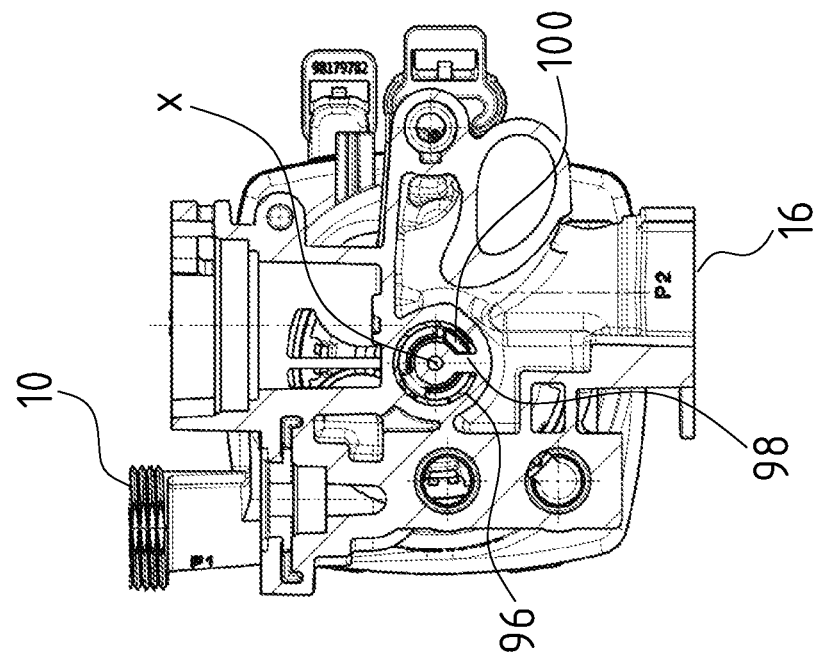
FIG. 17 is a sectional view according to FIG. 18 with the valve element in the first valve position.
Figure 16:
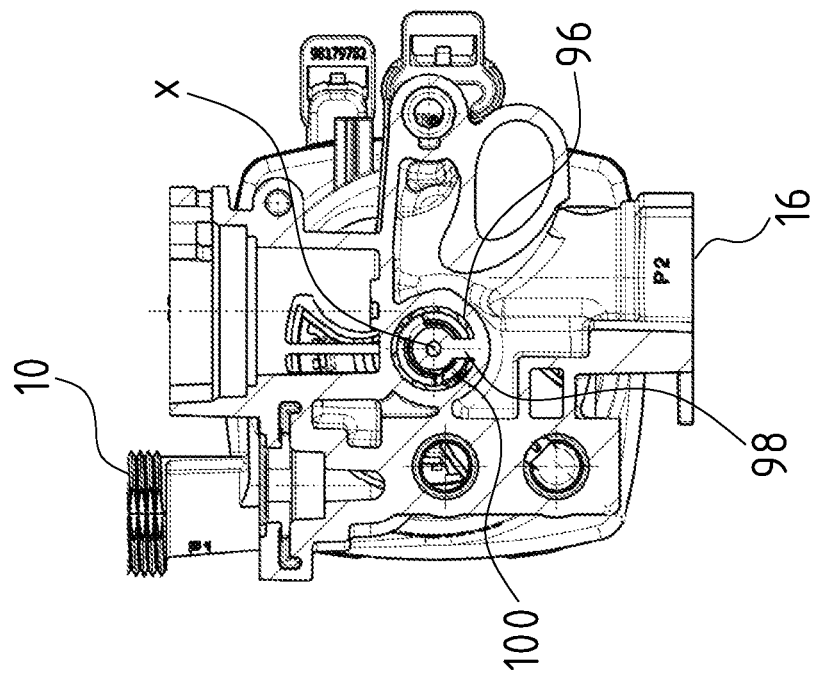
FIG. 16 is a sectional view of the pump housing along line XIII-XIII in FIG. 3 with the valve element in the second valve position.

The valve element 24 is moved between the two valve positions similar as known from EP 3 376 049 by the circulating flow produced by the impeller 14. If the speed of the electric drive motor is reduced or the motor is switched off by the control electronics 7 the pressure in the pump space 44 is reduced such that the compression spring 44 moves the valve element 24 in its released position as shown in FIG. 4. In this position the valve element 24 can be rotated about the rotational axis X by a circulating fluid flow inside the pump space 44. The direction of the fluid flow depends on the rotational direction of the impeller 14. The two valve positions are each defined by an end stop. For this there is provided a circular groove 96 in the bottom wall of the pump housing 8. This circular groove 96 does not define an entire circle but has an interruption in form of a web 98. The opposing surfaces of this web 98 define the two end stops for the rotational movement of the valve element 24, i.e. the end stops defining the two possible valve positions. The spring support 52 of the valve element 24 has an axial extension forming a stop element 100. The stop element 100 has a form of a finger offset to the rotational axis X and engaging into the groove 96. The stop element 100 can abut against the two opposing faces of the web 98 to define the two rotational positions corresponding to the possible valve position as described before. In this case it is advantageous that the stop is arranged in the center allowing a damping effect due to the elasticity of the parts and particularly by torsion of the compression spring 54 as described above. FIG. 13 shows the stop element 100 in the second valve position corresponding to the position shown in FIG. 7. FIG. 14 shows the stop element 100 in the first valve position corresponding to the valve position shown in FIG. 6. It can be seen that to change the valve position the valve element 24 rotates by 270°.

To enhance the rotation of the valve element 24 without increasing the flow resistance during normal operation of the pump device there are provided radial protrusions 102 distributed over the entire outer circumference of the valve element 24. The protrusions 102 are arranged on the backside of the cover plate 104 on the cover member 38 so that the cover member 36 has a cover plate 104 facing towards the impeller 14 extending in radial direction beyond these protrusions 102 so that the protrusions 102 are completely covered by this cover plate 104 on the side facing the impeller 14. Thus, the protrusions 102 are arranged on the backside of the cover plate 104. The cover plate 104 has a diameter smaller than the inner diameter of the pump housing 8 such that a circular gap 106 surrounding the outer circumference of the cover plate 104 is provided. The gap 106 provides a flow connection between the pump space 44 and the region in which the protrusions 102 are arranged. If the valve element 24 is in its sealed or engaged position as shown in FIG. 3, substantially no fluid flow through the gap 106 will occur since the flow path through the gap 106 is closed by the sealing 70 on the opposite end. However, if the valve element 24 is in its released position as shown in FIG. 4 there is a gap between the sealing 70 and the shoulder 68 opening the flow path through the gap 106 towards the opening 80 of the valve element 24, i.e. on the suction side of the valve element 24. Thus, if the impeller 14 rotates, a part of the fluid flow leaving the impeller 14 will enter the gap 106 and flow towards the opening 80 around the valve element 24 towards the outlet opening 26. Due to the rotation of the impeller 14 this side flow through the gap 106 has a spin in the rotational direction of the impeller acting on the rib or tooth shaped protrusions 102 generating a torque on the valve element 24 to rotate the valve element 24 until the stop element 100 abuts against the end stop provided by the web 98. If, now, the speed of the impeller is increased by the control electronics 7 the pressure on the outside of the impeller 14 increases so that the valve element 24 is moved into its sealed position in which the sealing 70 comes into contact with the shoulder 68 and one of the sealing portions 72, 74 comes into contact with an opposing valve seat 82, 84. In this operational condition a sealed valve position is reached. After this it is possible to quickly change the rotational direction of the impeller without moving the valve element 24 out of its present valve position. To achieve this, due to respective control by the control electronics 7 the electric drive motor is accelerated thus quickly that the pressure outside the impeller 24 generates an axial force overcoming the spring force of the compression spring 54 prior to establishing a circular flow rotating the valve element 24 into the other valve position. This allows to selectively move the valve element 24 into a desired valve position and afterwards to again change the rotational direction of the impeller 14 so that during operation of the centrifugal pump device the impeller 14 can always rotate in a desired optimized rotational direction. The arrangement of the protrusions 102 on the backside of the cover plate 104 has the advantage that the protrusions have an effect only if the valve element 24 is in its released position. During normal operation with the valve element is in its sealed position the protrusions 102 have nearly no effect, in particular they do not increase the hydraulic resistance in the pump space 44.

The electric motor inside the motor housing 4 is a wet-running electric motor having a rotor can 108 forming the rotor space inside which the rotor shaft 50 with the rotor 110 rotates. This rotor space is filled by the liquid to be pumped, i.e. preferably water. The stator 112 is arranged on the outside of the rotor can 108 in a dry stator space inside the motor housing 4.

Figure 18:
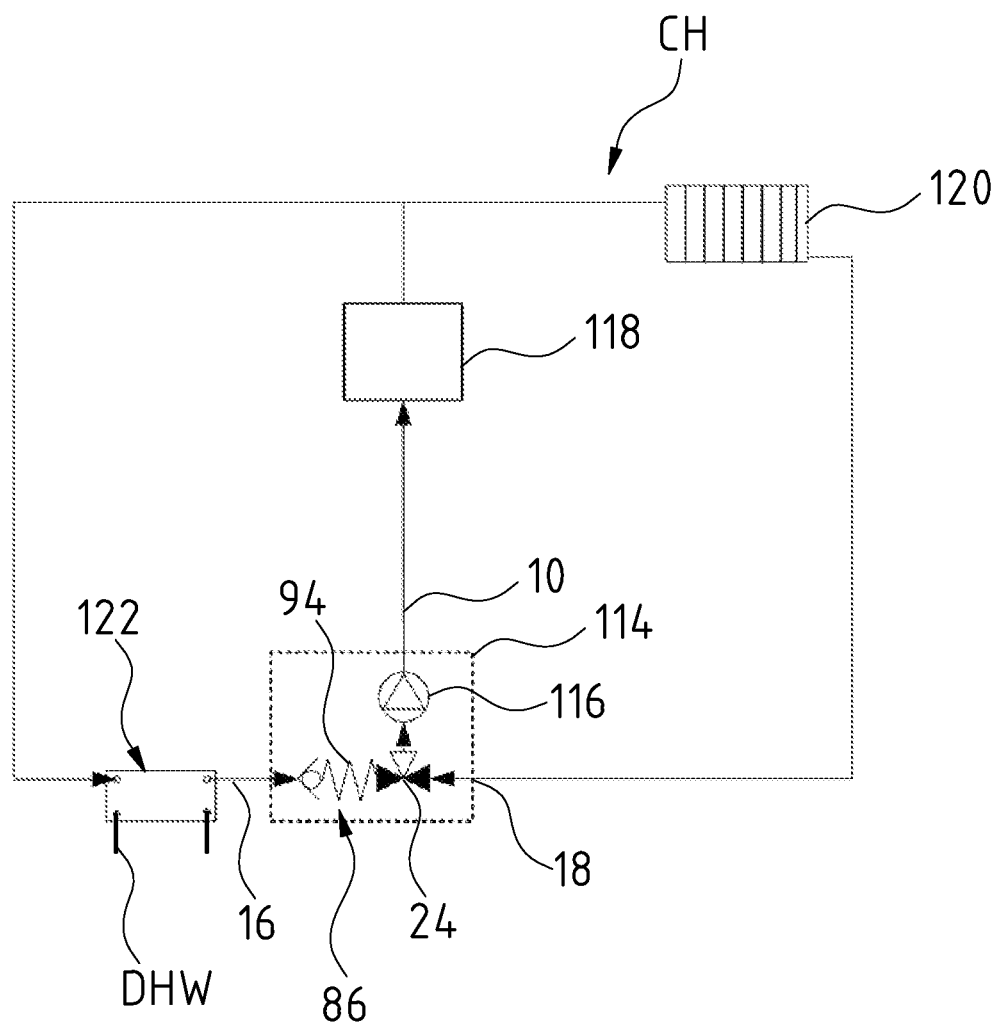
FIG. 18 is a schematical drawing of a hydraulic circuit of a heating system including a centrifugal pump according to the invention.

FIG. 18 shows an example for the use of the centrifugal pump device 114 described before. The centrifugal pump device including the features described before, i.e. the valve element 24 and the bypass valve 86 are the components surrounded by the dotted line in FIG. 18. The centrifugal pump device 114 comprises the centrifugal pump 116 with the electric drive motor 2 and the impeller 14. The valve element 24 forming a switch over valve is arranged on the suction side of the centrifugal pump 116 allowing to switch the flow path between two possible inlet connections, the first inlet connection 16 and the second inlet connection 18. On the pressure side the centrifugal pump 116 is connected with the outlet connection 10. In this example the outlet connection 10 is connected to a boiler 118 heating the liquid, in particular water, in the heating circuit. On the outlet side of the boiler 118 the heating circuit branches into a first branch forming the circuit of a central heating CH which may contain several radiators 120 or one or more floor heating circuits, for example, and the second branch for heating domestic hot water DHW. The second branch comprises a heat exchanger 122 for heating domestic hot water (DHW). As can been seen, the bypass valve is in connection with the second branch, i.e. the branch containing the heat exchanger 122. In case that the valve element 24 is in the valve position in which a flow path through the central heating circuit CH is open, the bypass valve 86 can prevent an overheating of the boiler 118. In this valve position, if the radiators 120 are closed, the fluid flow through the central heating circuit CH is interrupted. In this case the bypass valve 86 can open due to a pressure difference overcoming the biasing force of the compression spring 94 such that the flow path through the heat exchanger 122 opens and the water is circulated by the centrifugal pump 116 through the second branch of the heating system, i.e. through the heat exchanger 122, thereby distributing the heat produced by the boiler 180 in the system to avoid an overheating of the boiler 118.

Figure 19:
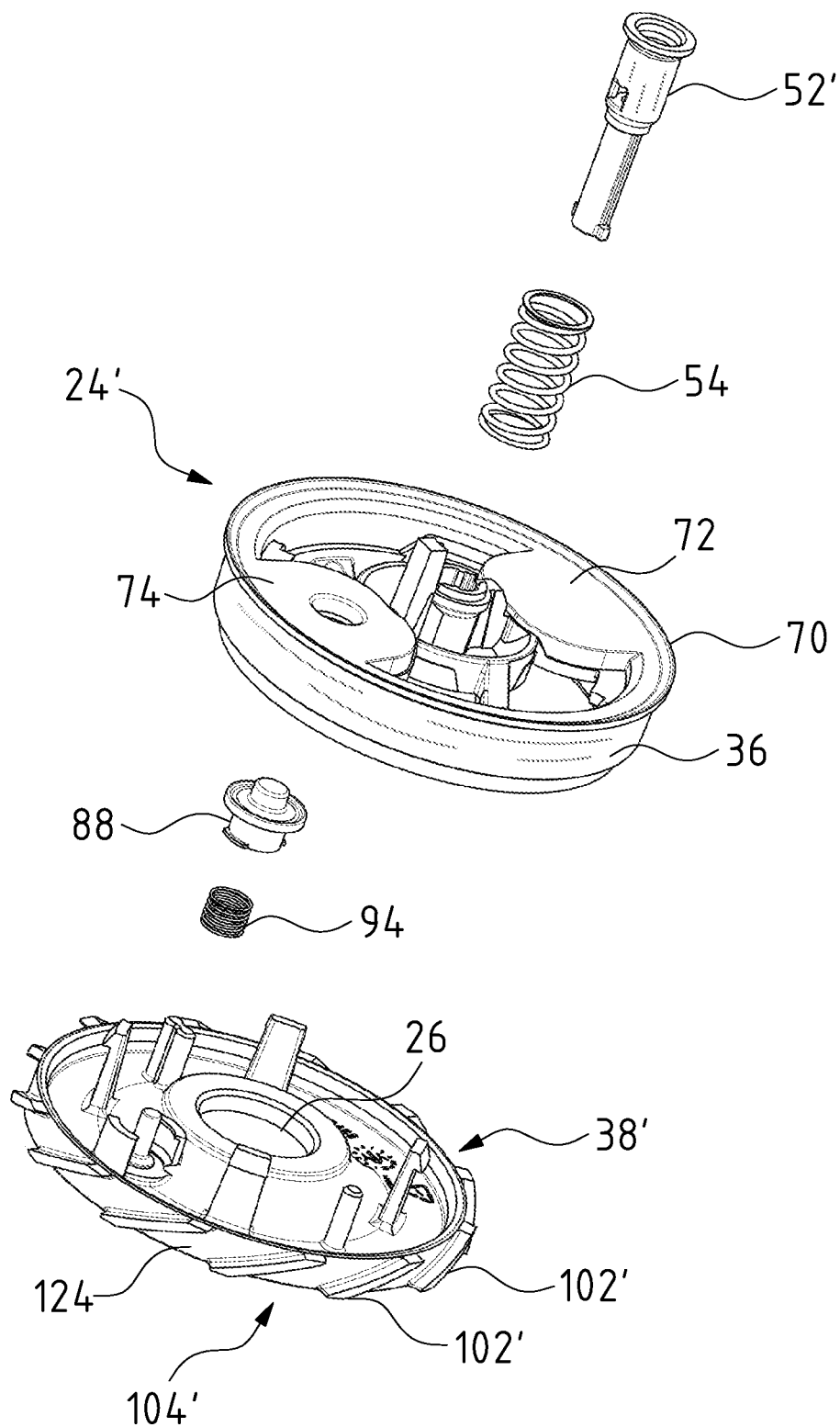
FIG. 19 is an exploded view of a valve element according to a second embodiment.
Figure 20:
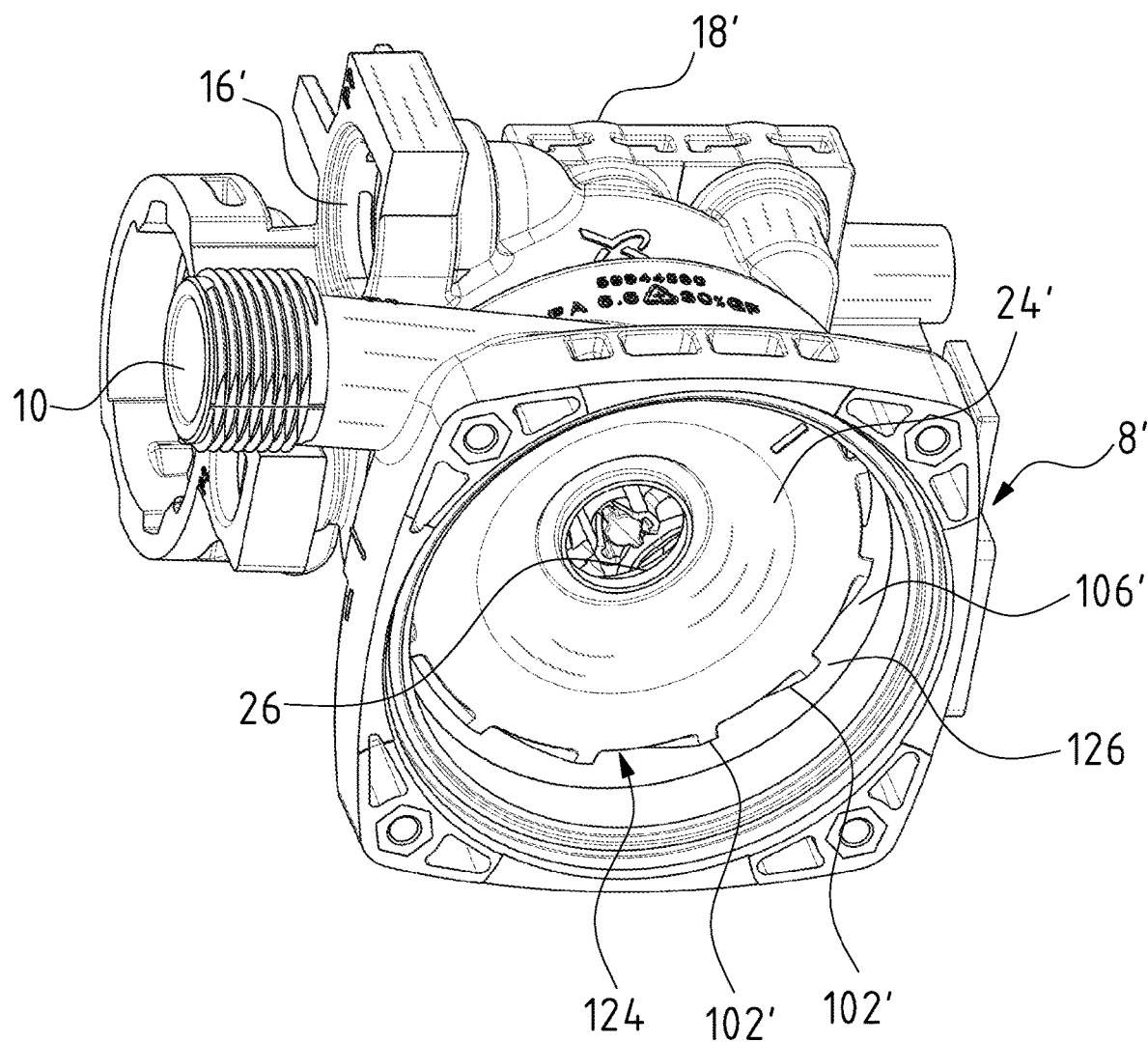
FIG. 20 is a perspective view of an open pump housing including the valve element as shown in FIG. 19.

FIG. 19 shows a second embodiment of the valve element 24'. In this embodiment the support member 36 including the bypass valve 86 is substantially the same as described above. In this second embodiment the cover member 38' of the valve element 24' has a different configuration. In this embodiment the protrusions 102' extend in radial direction from an outer circumferential surface 124. Furthermore, the protrusions 102' are inclined in circumferential direction such that they form inclined vanes on the outer circumferential surface 124 of the valve element. In this embodiment the cover plate 104' does not extend beyond the outer circumference of the circumferential wall 124, i.e. does not cover the axial end sides of the protrusions 102'. Thus, by use of this valve element 24' the gap 106' or ring-shaped space between the outer circumferential wall 124 of the valve element and an inner circumferential wall 126 of the pump housing 8' is open towards the space containing the impeller 14, as visible in FIG. 20. Thus, a fluid flow produced by the impeller 14 can directly impinge on the protrusions 102'. Due to their inclination the protrusions 102' produce a higher torque acting on the valve element 24' about the rotational axis X. The pump housing 8' with the valve element 24' as shown in FIG. 20 can be connected to the electric drive motor 2 as shown in FIG. 1 and described above. Furthermore, the impeller 14 can be the same as shown for the first embodiment.

While specific embodiments of the invention have been shown and described in detail to illustrate the application of the principles of the invention, it will be understood that the invention may be embodied otherwise without departing from such principles.

LIST OF REFERENCE NUMERALS 2 electric drive motor
4 motor housing
6 electronics housing
7 control electronics
8, 8' pump housing
10 outlet connection
12 outlet port
14 impeller
16, 16' first inlet connection
18, 18' second inlet connection
20 first inlet port
22 second inlet port
24, 24' valve element
26 outlet opening
28 suction mouth
30 pivot, bearing post
32 O-ring
34 notch
36 support member
38, 38' cover member
40 engagement hook
42 engagement shoulder
44 pump space
46 bearing plate
48 bearing
50 rotor shaft
52, 52' spring support
54 compression spring
56 engagement hooks
58 cut-out
60 rib
62 slots
64 bearing portion
66 bearing portion
68 shoulder
70 sealing
72 first sealing portion 74 second sealing portion
76, 78 sealing member
80 opening
82, 84 valve seats
86 bypass valve
88 bypass valve element
90 guiding element
92 opening
93 protrusion
94 compression spring
96 groove
98 web
100 stop element
102, 102' protrusions
104, 104' cover plate
106, 106' gap
108 rotor can
110 rotor
112 stator
114 centrifugal pump device
116 centrifugal pump
118 boiler
120 radiator
122 heat exchanger
124 outer circumferential wall
126 inner circumferential wall
CH central heating
DHW domestic hot water
X rotational axis

The invention claimed is:

1. A hydraulic valve device comprising:
a first inlet port;
a second inlet port; and
a valve element for selectively closing one of the first and the second inlet port, wherein the valve element is rotatable between two valve positions such that a surface of the valve element is moved in a direction parallel to openings of the inlet ports, wherein the valve element comprises two separate sealing portions, comprising a first sealing portion for closing the first inlet port and a second sealing portion for closing the second inlet port, the two sealing portions being arranged such that in a first valve position the first sealing portion closes the first inlet port and in a second valve position the second sealing portion closes the second inlet port, wherein the first sealing portion is completely closed and the second sealing portion comprises a bypass valve, the bypass valve being configured to open the second inlet port depending on the differential pressure acting on said valve element, with the second sealing portion closing the second inlet port.

2. A hydraulic valve device according to claim 1, wherein the bypass valve is a spring-loaded check valve.

3. A hydraulic valve device according to claim 1, wherein the openings of the first and the second inlet port facing the valve element are arranged in one plane.

4. A hydraulic valve device according to claim 1, wherein additionally the valve element is movable in axial direction along a rotational axis to bring the sealing portions in sealing contact with opposing valve seats of the inlet ports.

5. A hydraulic valve device according to claim 1, wherein the second sealing portion comprises a sealing member provided for contacting a valve seat of the second inlet port and being in contact with a bypass valve element of the bypass valve.

6. A hydraulic valve device according to claim 1, wherein the valve element comprises at least one inlet opening facing the first inlet port in one valve position and facing the other inlet port in the second valve position.

7. A hydraulic valve device according to claim 1, wherein the valve element comprises at least one mechanical end stop defining at least one of the two valve positions, which end stop is arranged radially inside the sealing portions.

8. A hydraulic valve device according to claim 1, wherein the valve element comprises at least one mechanical end stop defining at least one of the two valve positions, which end stop comprises a stop element connected to the valve element via a spring forcing the valve element in axial direction along the rotational axis.

9. A hydraulic valve device according to claim 1, wherein the hydraulic valve device forms a part of a centrifugal pump assembly, the centrifugal pump assembly comprising:
an electric drive motor;
at least one impeller driven by the drive motor; and
two suction ports, wherein the first inlet port of the hydraulic valve device forms a first suction port of the two suction ports and the second inlet port of the hydraulic valve device forms a second suction port of the two suction ports.

10. A hydraulic valve device according to claim 9, wherein the first and the second suction port are in fluid conducting connection with a suction mouth of the at least one impeller.

11. A hydraulic valve device according to claim 10, wherein the valve element comprises an outlet opening in engagement with the suction mouth of the impeller.

12. A hydraulic valve device according to claim 9, wherein for movement between the first and the second valve position said valve element is driven by a fluid flow produced by the impeller.

13. A hydraulic valve device according to claim 9, wherein the valve element is arranged between the suction side and the pressure side of the pump assembly such that a pressure produced by the impeller is acting on one side of the valve element and the first sealing portion of the valve element is forced against a valve seat of the first inlet port or the second sealing portion is forced against a valve seat of the second inlet port, depending on the respective valve position.

14. A hydraulic valve device comprising:
a first inlet port;
a second inlet port; and
a valve element for selectively closing one of the first and the second inlet port, wherein the valve element is rotatable between two valve positions such that a surface of the valve element is moved in a direction parallel to openings of the inlet ports, wherein the valve element comprises two separate sealing portions, comprising a first sealing portion for closing the first inlet port and a second sealing portion for closing the second inlet port, the two sealing portions being arranged such that in a first valve position the first sealing portion closes the first inlet port and in a second valve position the second sealing portion closes the second inlet port, wherein the valve element comprises a support member, a cover member and a movable bypass valve element being arranged between the support member and the cover member.

15. A hydraulic valve device according to claim 14, wherein the first and the second sealing portions are arranged on the support member.

16. A hydraulic valve device according to claim 14, wherein the support member and/or the cover comprises a guiding means guiding the movable bypass valve element along a predefined movement path.

17. A hydraulic valve device according to claim 14, wherein the valve element further comprises another bypass valve element to provide at least two exchangeable bypass valve elements of different size, wherein the size of the bypass valve element defines the opening pressure of the bypass valve.

* * * * *